United States Patent
Ohgaki (10) Patent No.: US 7,051,345 B2
(45) Date of Patent: May 23, 2006

(54) REMOVABLE DISK DRIVE APPARATUS

(75) Inventor: Satoshi Ohgaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/220,594

(22) Filed: Sep. 8, 2005

(65) Prior Publication Data

US 2006/0005213 A1    Jan. 5, 2006

Related U.S. Application Data

(62) Division of application No. 10/073,419, filed on Feb. 13, 2002, now Pat. No. 6,959,443.

(30) Foreign Application Priority Data

Feb. 19, 2001    (JP) ............................... 2001/41114

(51) Int. Cl.
*G11B 17/03*    (2006.01)
(52) U.S. Cl. ..................................... 720/603
(58) Field of Classification Search ................ 720/603
See application file for complete search history.

(56) References Cited

U.S. PATENT DOCUMENTS 5,737,304 A * 4/1998 Soga et al. ................. 720/692
6,618,340 B1 * 9/2003 Sawada ...................... 720/603

FOREIGN PATENT DOCUMENTS

| EP | 0 764 947 A2 | 3/1997 |
| EP | 1 079 384 A2 | 2/2001 |
| JP | H04-238150 A | 8/1992 |
| JP | H06-044661 A | 2/1994 |
| JP | 2000-322803 A | 11/2000 |
| JP | P2001-67761 A | 3/2001 |

* cited by examiner

*Primary Examiner*—David Davis
(74) *Attorney, Agent, or Firm*—Sughrue Mion, PLLC (57) ABSTRACT

A removable disk drive apparatus can insert a smaller diameter disk into a tray of a vertical drive device, and improve the reliability of the disk supporting function. The tray, on which a plurality of concave portions for a disk for supporting disk storage media having different diameters are formed in the concentric positions, includes larger disk support lugs provided at plural points on the periphery of the concave portion for a larger diameter disk, and smaller disk support lugs provided at plural points on the periphery of the concave portion for a smaller diameter disk. The smaller disk support lugs include a storage groove provided at a plurality of points on the periphery of the concave portion for a larger diameter disk, flexible lugs with elastic deformation supported in the storage groove, and having tip portions projecting into the periphery of the concave portion for a smaller diameter disk, and a stopper for keeping the tip portions of the flexible lugs projecting above the surface of the periphery of the concave portion for a smaller diameter disk from the storage groove.

4 Claims, 11 Drawing Sheets

PRIOR ART

REMOVABLE DISK DRIVE APPARATUS

This is a divisional of application Ser. No. 10/073,419 filed Feb. 13, 2002, now U.S. Pat. No. 6,959,443. The entire disclosure of the prior application, application Ser. No. 10/073,419 is hereby incorporated by reference.

BACKGROUND OF THE INVENTION

1. Field of the Invention

The present invention relates to a drive device for driving a disk storage medium such as CD-ROM, DVD-ROM, etc., and more specifically to a drive device for rotating various types of disk storage media having different diameters in a vertical plane, that is, a vertical drive device.

2. Description of the Related Art

Figure 11:
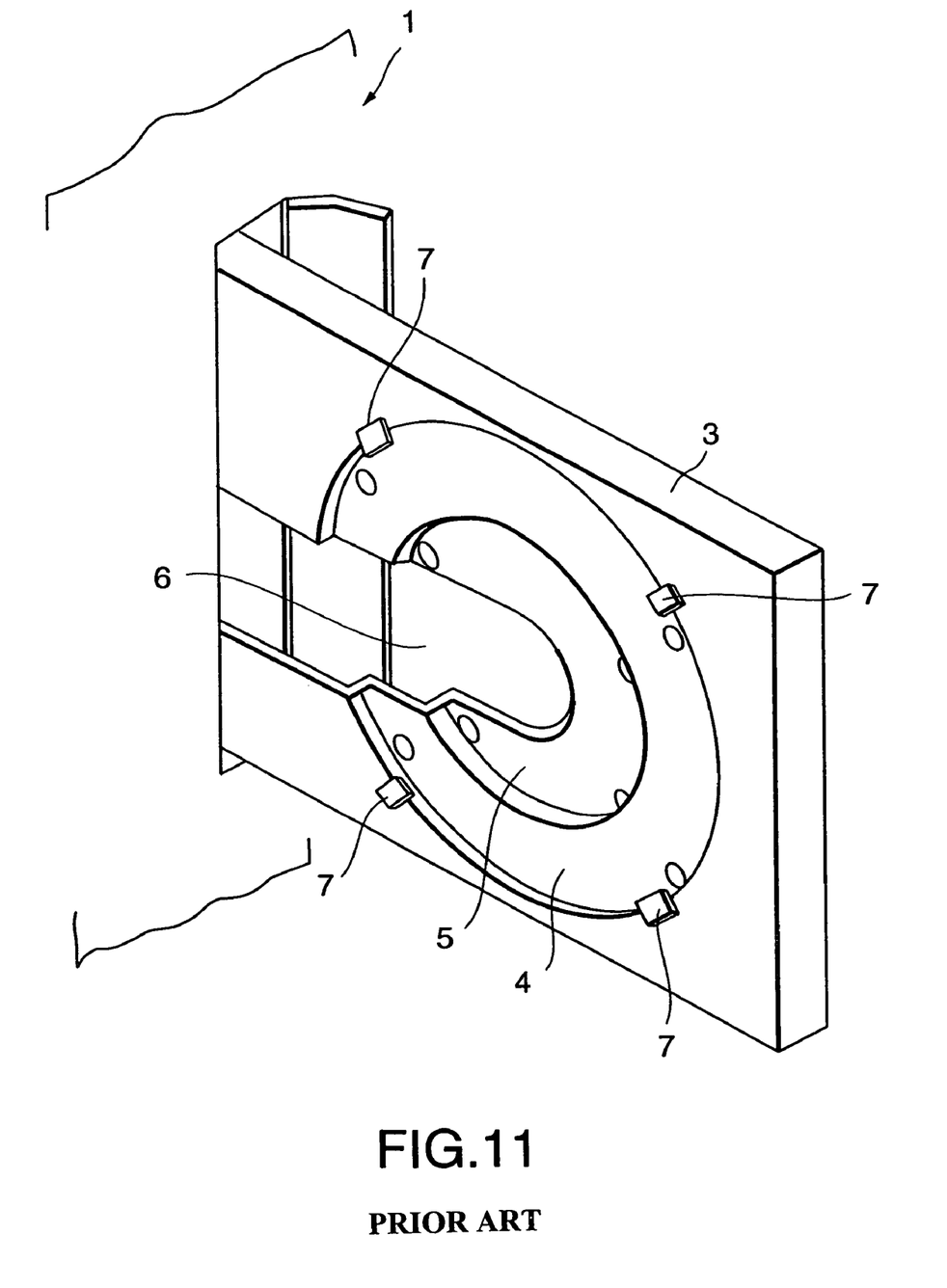
FIG. 11 is a perspective view of the appearance of the tray of the conventional vertical drive device.

A 12 cm diameter disk storage medium (herein after referred to as a 12 cm disk) and an 8 cm diameter disk storage medium (hereinafter referred to as an 8 cm disk) are suggested as disk storage media such as CD-ROM, DVD-ROM, etc. For a drive device for driving a disk, a drive device capable of driving disks having different diameters is suggested. As shown in FIG. 11, such a drive device includes a tray 3 which is able to get in and out of a drive device body 1 and supports a disk storage medium. The tray 3 is provided with a circular concave portion 4 for a 12 cm disk, and is also provided on the bottom of the concave portion 4 for a 12 cm disk with a circular concave portion 5 for an 8 cm disk. Furthermore, the drive device is provided with a head spindle motor passage groove 6 for the drive device body 1 from the centers of the concave portions 4 and 5. When a 12 cm disk is inserted into the drive device body 1, the spindle of the spindle motor provided in the drive device body 1 (not shown in the attached drawings) is fit into the center hole of the 12 cm disk by loading the 12 cm disk in the concave portion 4 for a 12 cm disk, thereby rotating the disk. Similarly, when an 8 cm disk is inserted, the drive device can rotate the 8 cm disk by loading it into the concave portion 5 for an 8 cm disk.

Recently, a vertical drive device for rotating a disk on a vertical plane has been provided with a view to reducing the installation space. With such a vertical drive device, a disk falls in the vertical direction if the disk is inserted into the concave portion 4 or 5 of the tray 3 having the above mentioned configuration as described above, or it slips off the concave portion 4 or 5 of the tray 3, thereby failing to support the disk storage medium in the concave portion 4 or 5. Therefore, the vertical drive device has disk support lugs 7 projecting inward at several points on the periphery of the concave portion 4 for a 12 cm disk as shown in FIG. 11. In this example, they are provided at four points, that is, two upper points and two lower points. The disk support lugs 7 prevent 12 cm disks from falling or being slipped off.

However, with the above mentioned configuration, since no disk support lugs are provided on the periphery of the concave portion 5 for an 8 cm disk, the vertical drive device has the difficulty in inserting an 8 cm disk into the tray 3 and supporting the disk because the above mentioned disk support lugs provided on the periphery of the concave portion 5 for an 8 cm disk are obstacles to a 12 cm disk to be inserted into the concave portion 4 for a 12 cm disk. A simple measure for solving the problem is an 8 cm disk mounted on the adapter formed similarly in outside diameter to fit the 12 cm disk when an 8 cm disk is used. Then, the adapter is inserted into the concave portion 4 for a 12 cm disk. However, with the configuration, a user has to additionally and wastefully purchase the adapter. Accordingly, such a measure is not economical.

On the other hand, Japanese Patent Laid-Open No. 2000-322803 discloses the technology in which the disk support lugs provided on the periphery of the concave portion for a 12 cm disk can move along the surface of the tray. By adjusting the rotating positions of the disk support lugs, the tip portions of the disk support lugs can be projected inward from the positions on the periphery of the common concave portion for a 12 cm disk to the positions on the periphery of the concave portion for an 8 cm disk. Therefore, the 8 cm disk can be inserted into the concave portion for an 8 cm disk and supported by the disk support lugs of the vertical drive device.

In the technology described by the above mentioned publication, the disk support lugs have to be moved along the surface of the tray, that is, along the vertical plane, and held at the positions after the movement, thereby complicating the structure of holding the movement positions. That is, in addition to the tray, the disk support lugs, the rotation arm for holding the lugs, the spindle for supporting the rotation arm, etc. are required as the components. Furthermore, the operation of setting the components is also required. Normally, the movement positions of the disk support lugs are held using the friction on the spindle supporting the disk support lugs. However, when the system is designed and produced such that a larger friction can be obtained, the operability for setting the movement positions of the disk support lugs is poor, and it is difficult to set the disk support lugs at desired positions. Then, undesired force is applied to the tray and disk support lugs during the operations, thereby possibly damaging the tray and the disk support lugs. On the other hand, if the system is designed and produced such that a smaller friction can be obtained, the disk support lugs are moved downward by the gravity through the frictional wear etc. by repetitive use. Then, the disk supporting function by the disk support lugs at the lower portion of the tray is reduced. Otherwise, the disk support lugs at the upper portion of the tray move up to the surface of a 12 cm disk. As a result, they become obstacles in loading and removing a 12 cm disk, thereby causing trouble.

SUMMARY OF THE INVENTION

The present invention aims at providing a removable disk drive apparatus equipped with a disk supporting mechanism having the function of supporting a disk with high reliability and an easy operation.

The removable disk drive apparatus according to the present invention includes a tray on which a plurality of concave portions for a disk supporting disk storage media having different diameters are formed in the concentric positions. The tray includes larger disk support lugs provided at plural points on the periphery of the concave portion for a larger diameter disk, and smaller disk support lugs provided at plural points on the periphery of the concave portion for a smaller diameter disk. The smaller disk support lugs include a storage groove provided at a plurality of points on the periphery of the concave portion for a larger diameter disk, flexible lugs with elastic deformation supported in the storage groove, and having tip portions projecting into the periphery of the concave portion for a smaller diameter disk, and a stopper to keep the tip portions of the flexible lugs projecting above the surface of the periphery of the concave portion for a smaller diameter disk from the storage groove.

The flexible lug is fixed to the tray with its base portion, and is formed as an elastic one point support structure. The tip portion can be deformed elastically in the thickness direction of the tray using the base portion as a fulcrum. For example, the flexible lugs can be configured by bending an elastic metal line material in a U-shaped form, fixing the base portions on both ends to the end surfaces of the outer periphery of the storage groove, and allowing the tip portion of the U-shaped unit to project into the periphery of the concave portion for a smaller diameter disk from the storage groove. The stoppers are configured by projections projecting opposite each other on both sides of the storage groove. When the flexible lugs are subject to elastic deformation, they pass over the stoppers to suppress the restoration of the elasticity.

In the removable disk drive apparatus according to the present invention, the tip portions of the lower flexible lugs of the smaller disk support lugs are bent by fingers etc. for elastic deformation when a smaller diameter disk is inserted into the drive device. The flexible lugs are subject to elastic deformation using the base portion as a fulcrum. The intermediate portion passes over the stopper, and the tip portions of the flexible lugs are projected above the surface of the periphery of the concave portion for a smaller diameter disk. Therefore, by inserting a smaller diameter disk into the tray using the flexible lugs, the removable disk drive apparatus according to the present invention prevents the smaller diameter disk from slipping off the concave portion for a disk using the flexible lugs. Furthermore, by similarly bending the upper flexible lugs, the removable disk drive apparatus according to the present invention also prevents the smaller diameter disk from falling in the vertical direction using the flexible lugs, thereby stably supporting the smaller diameter disk on the tray.

In addition, the removable disk drive apparatus according to the present invention includes a tray on which a plurality of concave portions for a disk for supporting disk storage media having different diameters are formed in the concentric positions. The tray includes larger disk support lugs provided at a plurality of points on the periphery of the concave portion for a larger diameter disk, and a storage groove provided at a plurality of points on the periphery of the concave portion for a smaller diameter disk. The storage groove includes a first concave portion provided opposite each other in the radial direction in the position closer to the center of the concave portion for a smaller diameter disk on both sides of the storage groove, a second concave portion opposite each other in the radial direction in the position apart from the center of the concave portion for a smaller diameter disk; and a rotating lug provided in the storage groove, and having a first convex portion and a second convex portion on both sides respectively corresponding to the first and second concave portions in the storage groove.

The rotating lugs are supported rotatably by fitting the second convex portion into the second concave portion in the storage groove, the rotating lugs rotate using as an axis the second convex portion on both sides fit into the second concave portion when the first convex portion is removed from the first concave portion on both sides, the rear ends of the rotating lugs touch the storage groove when the first convex portion on both sides passes over the edge which is the boundary between the concave portion for a larger diameter disk and the storage groove, thereby holding the state in which the tip portions of a smaller diameter disk of the project above the surface of the periphery of the concave portion for a smaller diameter disk from the storage groove.

The front convex portions on both sides and the corresponding front concave portions are hemispherical, and the rear convex portion on both sides and the corresponding rear concave portions are cylindrical. With the configuration, when force is applied to the front convex portions on both sides and the corresponding front concave portions, they slip off each other because they are hemispherical. However, when force is applied to the rear convex portions on both sides and the corresponding rear concave portions, they can rotate but does not slip off each other because they are cylindrical.

Furthermore, the rotating lugs branch off in three units from one plate, the branch units on both ends are radially spread on the concave portion for a larger diameter disk, and the distance between both outer sides of the branch units is formed a little larger than the width of the storage groove. With the configuration, since the branch units on both ends are subject to elastic deformation when the rotating lugs are stored in the storage groove, the branch units are pushed to the storage groove by the repulsion. Therefore, the rear convex portions on both sides and the corresponding rear concave portions do not easily slip off each other.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

DESCRIPTION OF THE PREFERRED EMBODIMENTS

Figure 1:
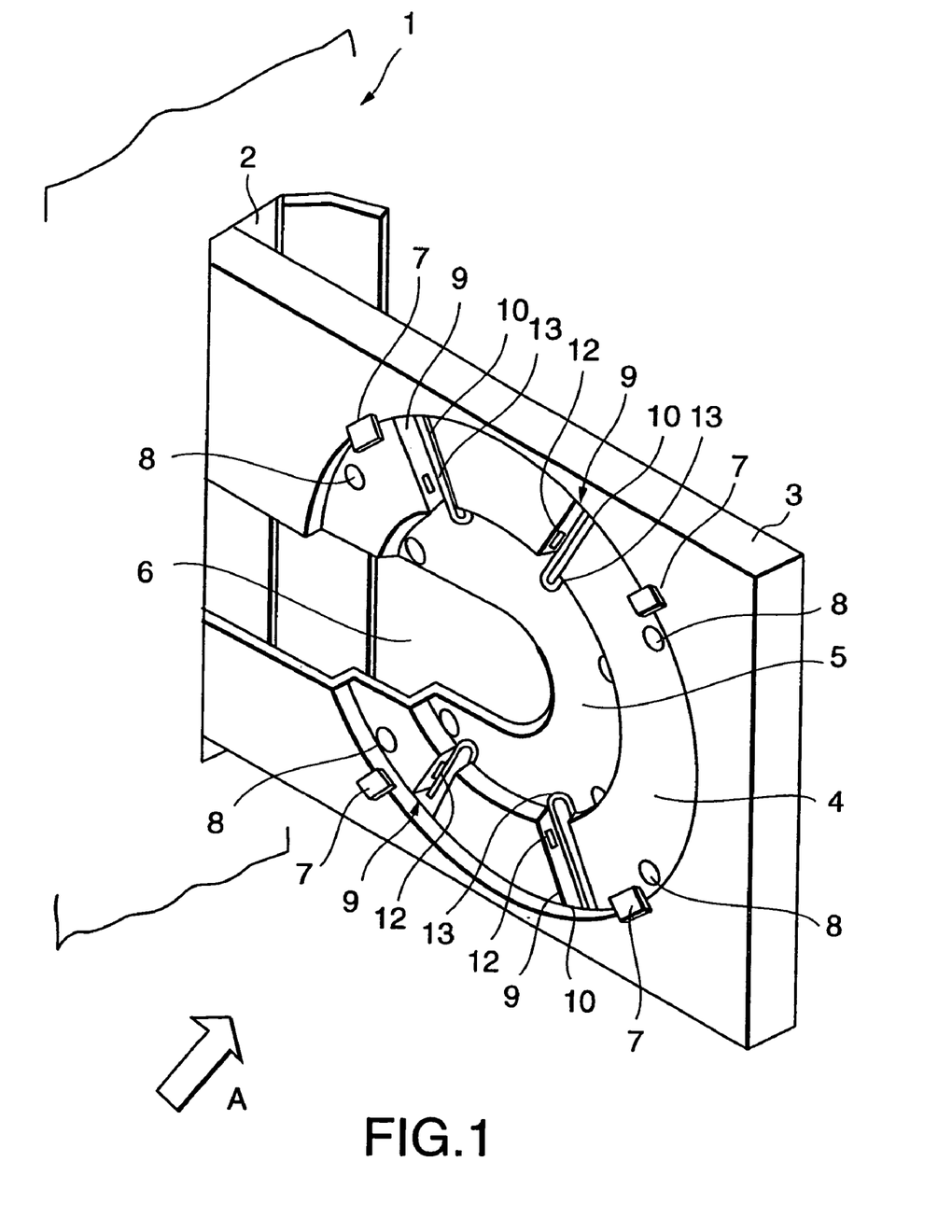
FIG. 1 is a perspective view of the tray of the drive device according to a first embodiment of the present invention.

A first embodiment of the present invention will be described below by referring to the attached drawings. FIG. 1 is a perspective view of the appearance of the embodiment in which the drive device according to the present invention is applied to the vertical tray loading drive device. The tray loading drive device is obtained by allowing the tray 3 to get in and out through a long narrow opening 2 in the vertical direction to the installation plane of the drive device body 1. The tray loading drive device allows a circular disk storage medium (not shown in the attached drawings) to be freely loaded or removed with the tray 3 being pulled out. The tray loading drive device rotates the disk storage medium supported on the tray 3 with the tray 3 held in the opening 2 of the drive device body. The tray driving mechanism for freely taking the tray 3 in and out and the rotating mechanism for the disk storage medium in the drive device body 1 are not shown in the attached drawings, and the detailed explanation of them is omitted here.

Figure 2:
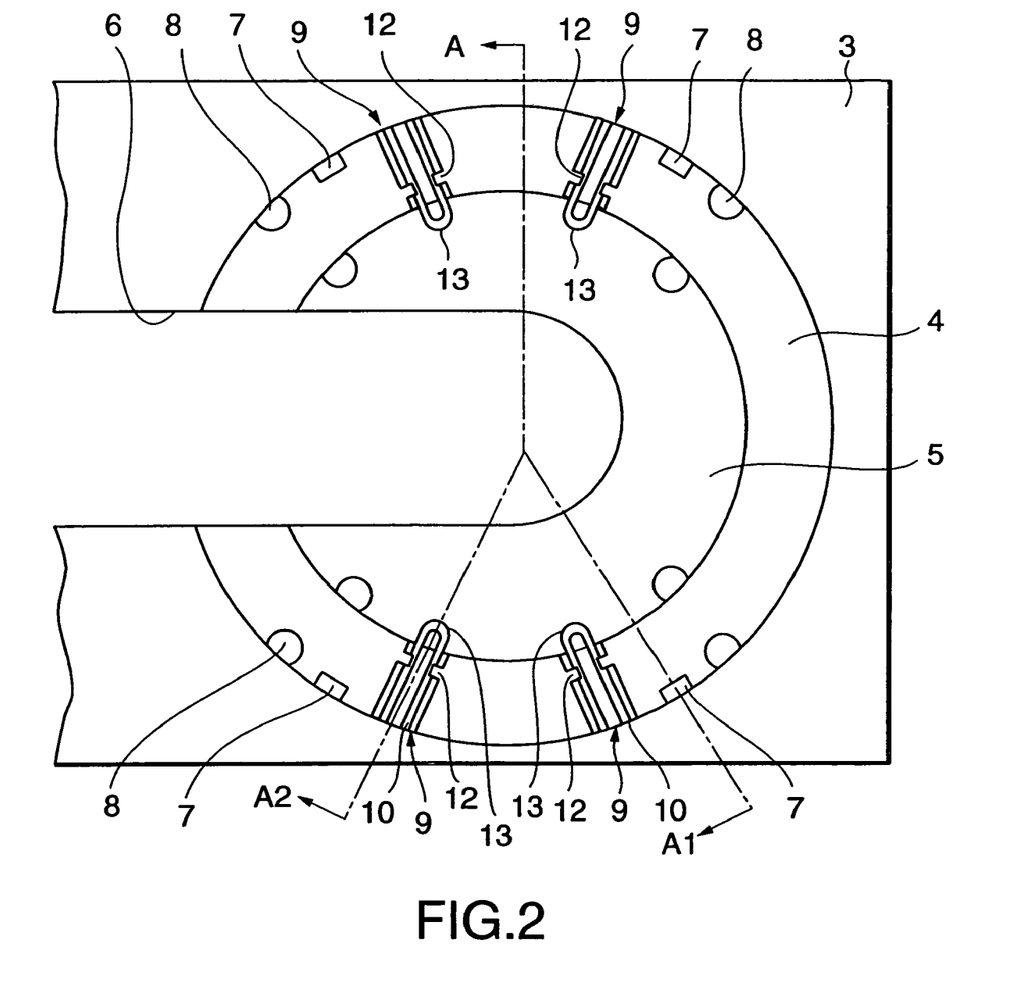
FIG. 2 is a side view (top surface) of the tray shown in FIG. 1.

The tray 3 is formed as an extended plate member in the vertical plane as described above. For example, the tray 3 is made of resin. FIG. 2 is a side view (hereinafter referred to as a top surface) of the tray 3 viewed from the A direction shown in FIG. 1. On the top surface, the concave portion 4 for a 12 cm disk having sufficient diameter and depth for storage of a 12 cm disk is provided. In the inner bottom of the concave portion 4 for a 12 cm disk, the concave portion 5 for an 8 cm disk having sufficient diameter and depth for storage of an 8 cm disk is provided concentrically. In addition, the head spindle motor passage groove 6 for the passage of the recording head and the spindle motor provided in the drive device body 1 (not shown in the attached drawings) is formed from the end of the drive device body 1 side of the tray 3 to the central area of the concave portions 4 and 5 for the disks.

Figure 3A:
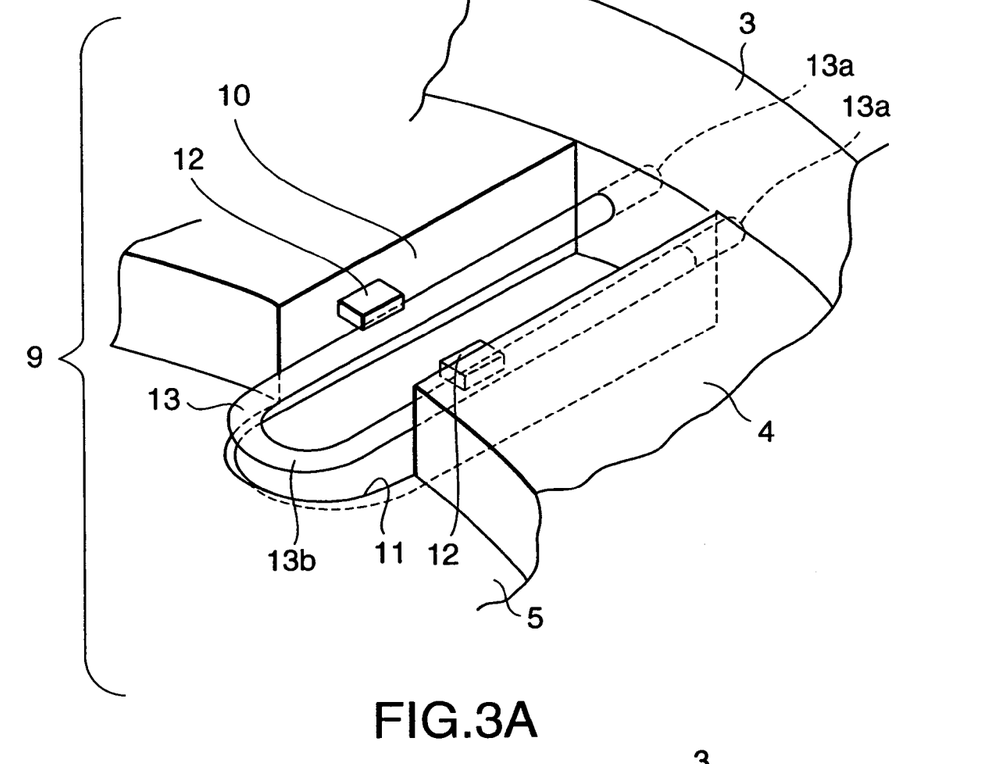
FIGS. 3A and 3B are a perspective view and a sectional view showing the detailed structure of the smaller disk support lugs shown in FIG. 1.
Figure 3B:
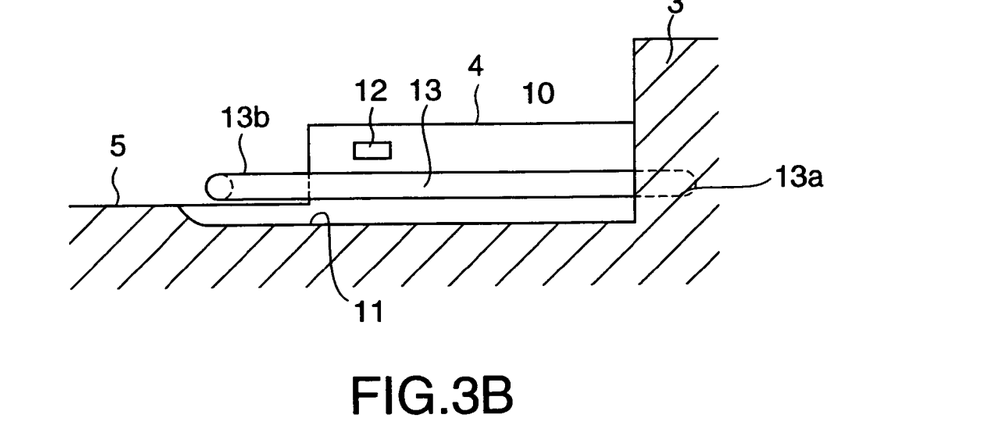

Furthermore, in the tray 3, at plural points on the periphery of the concave portion 4 for a 12 cm disk, at four points, that is, two upper points and two lower points, the larger disk support lugs 7 projecting inward a little are formed in combination with the tray 3. At the four points on the periphery of the bottom of the concave portions 4 and 5 for disks, circular protective projections 8 for supporting and protecting the disks are provided. Additionally, in the positions on the periphery different from the positions of the four larger disk support lugs 7, at the four points, that is, at the two upper points and two lower points between two upper and two lower larger disk support lugs 7 along the periphery of the concave portion for an 8 cm disk, smaller disk support lugs 9 are provided. That is, by referring to the oblique view and the sectional view as shown in FIGS. 3A and 3B, the smaller disk support lug 9 comprises a storage groove 10, a stopper 12, flexible lugs 13, and a shallow groove portion 11. The storage groove 10 is radially formed on the inner bottom of the concave portion 4 for a 12 cm disk. The depth of the four storage grooves 10 is at least the same as that on the bottom of the concave portion 5 for an 8 cm disk. According to the embodiment, the depth is a little larger. Therefore, the bottom of the storage groove 10 is formed as the shallow groove portion 11 in the area covering the periphery portion of the concave portion 5 for an 8 cm disk.

In the positions closer to the inside diameter on both sides opposite in the radial direction of the storage groove 10, a pair of tongue-shaped stoppers 12 are provided in small dimensions in the position closer to the bottom of the concave portion 4 for a 12 cm disk. In the storage groove 10, the flexible lugs 13 are fixed and supported after being obtained by bending an elastic metal line material in the U-shaped form. The flexible lugs 13 are set on the inner bottom of the concave portion 5 for an 8 cm disk in the position closer to the bottom of the concave portion 5 for an 8 cm disk than the stopper 12. The U-shaped plane of the flexible lug 13 is parallel to the inner bottom of the concave portion 5 for an 8 cm disk. Then, the two base portions 13a of the U-shaped flexible lugs are fixed as embedded in the end surfaces in the outside diameter direction of the storage groove 10. Additionally, the tip portions 13b of the U-shaped flexible lugs 13 are projected in the inside diameter direction from the storage groove 10, and positioned in the periphery of the concave portion 5 for an 8 cm disk. The width of the flexible lugs 13 is a little larger than the space between the opposite stoppers 12.

Figure 5A:
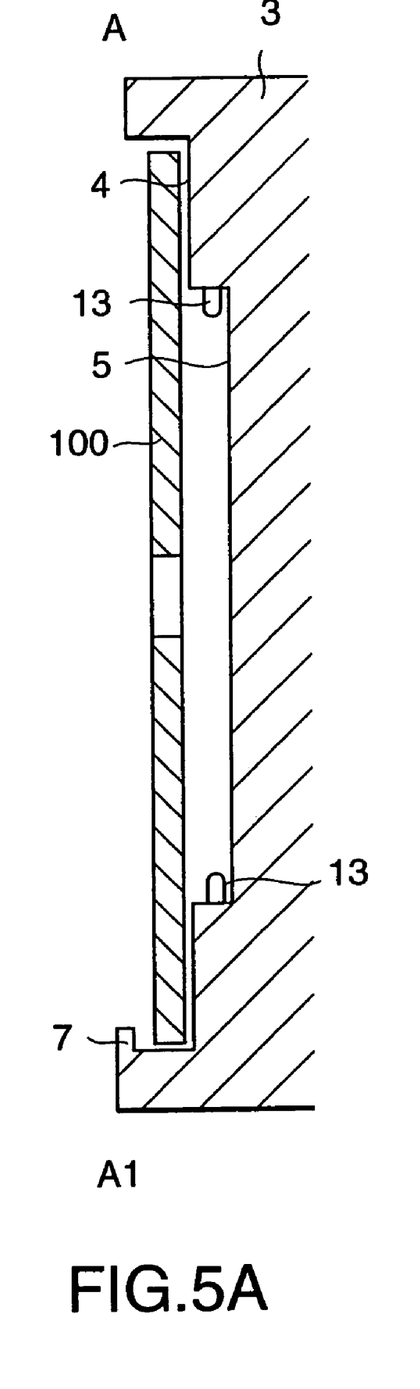
FIGS. 5A and 5B are sectional views of supporting 12 cm and 8 cm disks taken along the lines A–A1 and A–A2 shown in FIG. 2.

With the above mentioned configuration, when a 12 cm disk is inserted into the drive device body 1, the tray driving mechanism (not shown in the attached drawings) is operated, the tray 3 is pulled out of the drive device body 1, and the 12 cm disk is inserted into the concave portion 4 for a 12 cm disk. At this time, FIG. 5A is a sectional view taken along the line A–A1 shown in FIG. 2. As shown in the sectional view, by the larger disk support lugs 7 provided on the periphery of the concave portion 4 for a 12 cm disk, the lower periphery and the upper periphery of a 12 cm disk 100 are supported. Therefore, the 12 cm disk 100 can be protected from vertically falling or slipping off the concave portion 4 for a 12 cm disk. Since the flexible lugs 13 of the smaller disk support lugs 9 are in the storage groove, the 12 cm disk 100 does not interfere with the flexible lugs 13, thereby the 12 cm disk 100 is stably supported in the concave portion 4 for a 12 cm disk.

Figure 4A:
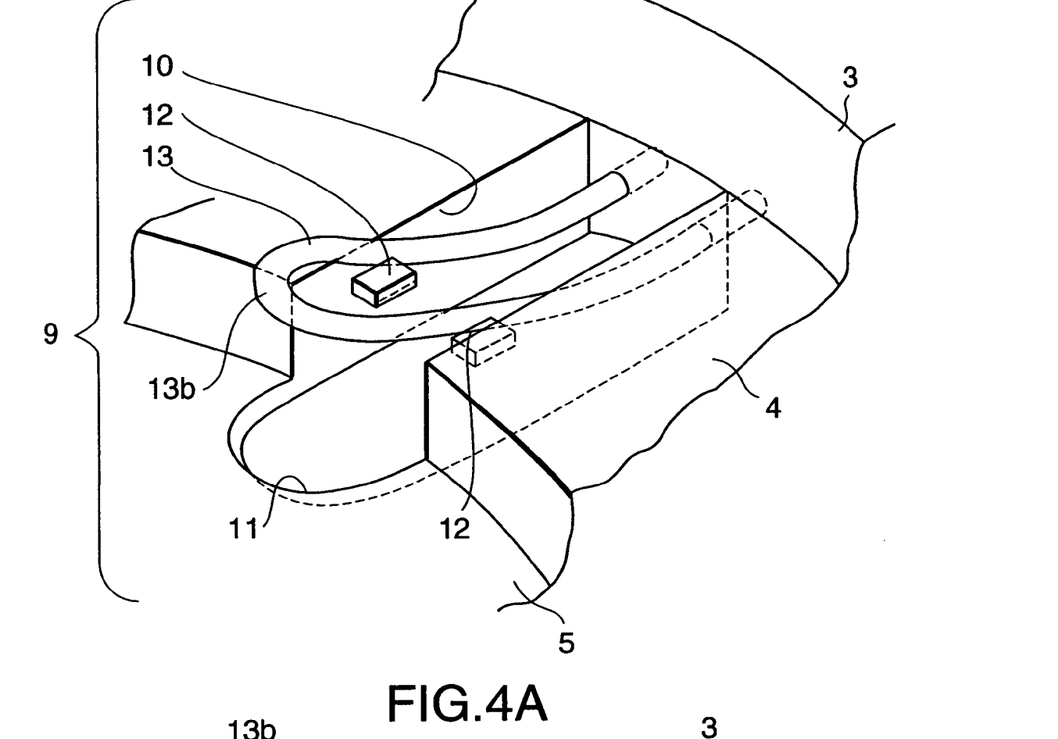
FIGS. 4A and 4B are a perspective view and a sectional view showing the detailed structure in operation of the smaller disk support lugs shown in FIG. 1.
Figure 4B:
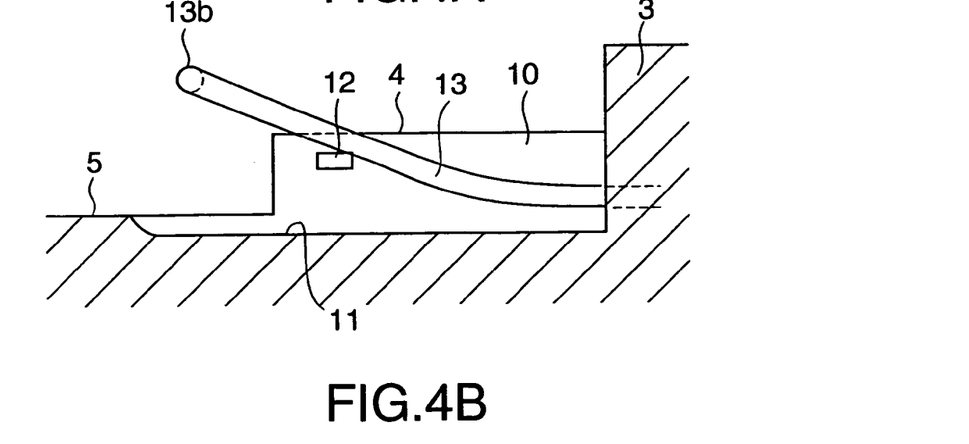
Figure 5B:
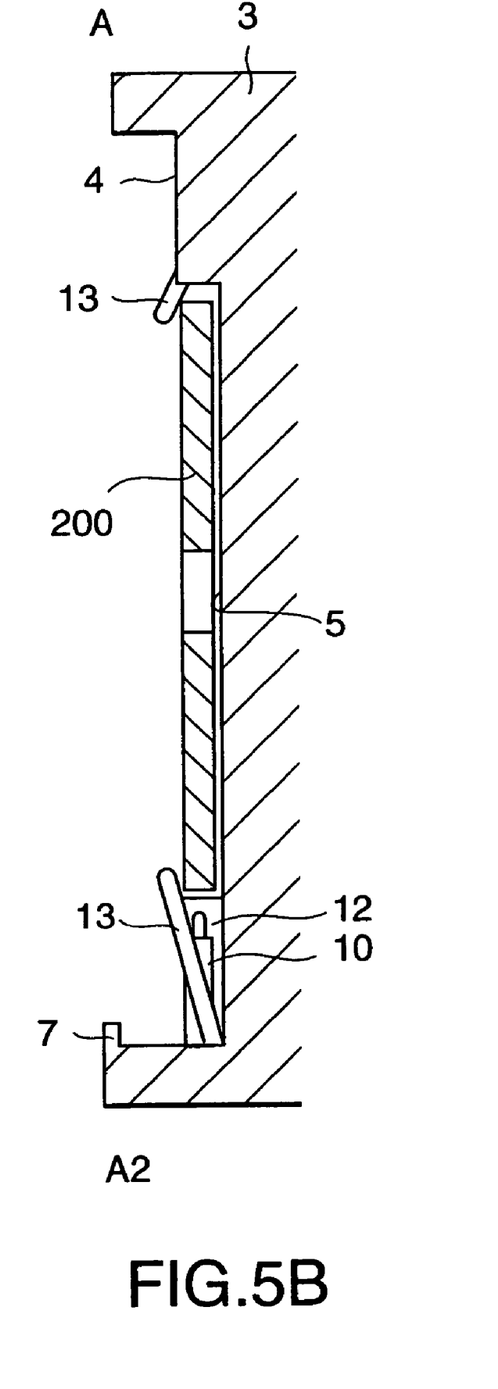

On the other hand, when an 8 cm disk is inserted into the drive device body 1, the tray 3 is pulled out of the drive device body 1, and the 8 cm disk is inserted using the smaller disk support lugs 9. That is, as shown in the oblique view and the sectional view in FIGS. 4A and 4B, the U-shaped tip portion 13b of the flexible lug 13 of the smaller disk support lug 9 is taken by fingers etc., bent, and deformed toward the top surface of the tray 3. Thus, the flexible lug 13 is elastically deformed in a curved state using a base portion 13a as a fulcrum, the intermediate portion passes over the stopper 12, and the tip portion 13b of the flexible lug 13 is projected over the bottom of the concave portion 4 for a 12 cm disk and the periphery of the concave portion 5 for an 8 cm disk. Then, although the fingers are detached from the flexible lug 13, the flexible lug 13 is suppressed from the restoration by elasticity by the stopper 12. Therefore, the above mentioned state can be maintained. As a result, when an 8 cm disk is inserted using the flexible lug 13 in this state, an 8 cm disk 200 is inserted into the concave portion 5 for an 8 cm disk by the flexible lug 13 as shown in the sectional view in FIG. 5B taken along the line A–A2 shown in FIG. 2. In this state, the disk can be protected from slipping off the concave portion 5 for an 8 cm disk. Furthermore, using the flexible lugs 13 of the two upper smaller disk support lugs 9, the 8 cm disk 200 can be protected from falling in the vertical direction, thereby stably supporting the 8 cm disk 200 in the concave portion 5 for an 8 cm disk.

When an 8 cm disk is not used, and the tip portions of the flexible lugs 13 are pushed inward in the storage groove 10 by fingers etc., the flexible lugs 13 pass over the stopper 12 by the restoration by elasticity, and the normal state shown in FIG. 3 can be obtained again. Thus, as shown in FIG. 5A, a 12 cm disk can be inserted and supported again. Thus, when an 8 cm disk in used, the tray structure according to the embodiment of the present invention can be realized only by bending a part or all of the flexible lugs 13 for elasticity deformation. In addition, the flexible lugs 13 can support an 8 cm disk with the bending state held by the stopper 12. Therefore, the tray structure according to the present embodiment simplifies the operation of freely inserting and removing a disk, and does not require the complicated rotating structure required in the conventional technology. As a result, it only requires simple designing and producing processes. Especially, when the tray 3 is made of resin, the tray structure according to the present embodiment can be obtained by incorporating the storage groove 10 and the stopper 12 into the tray 3 only by changing the design of a part of the metal mold. Then, the tray structure according to the present embodiment is obtained only by attaching the flexible lugs 13 to the tray 3. As a result, the number of necessary parts is very small, and the production process is very easy. Furthermore, in the tray structure according to the present embodiment, the reliability is not reduced by the frictional wear etc. occurring in the conventional technology, thereby stably supporting the disks for a long period.

Figure 6:
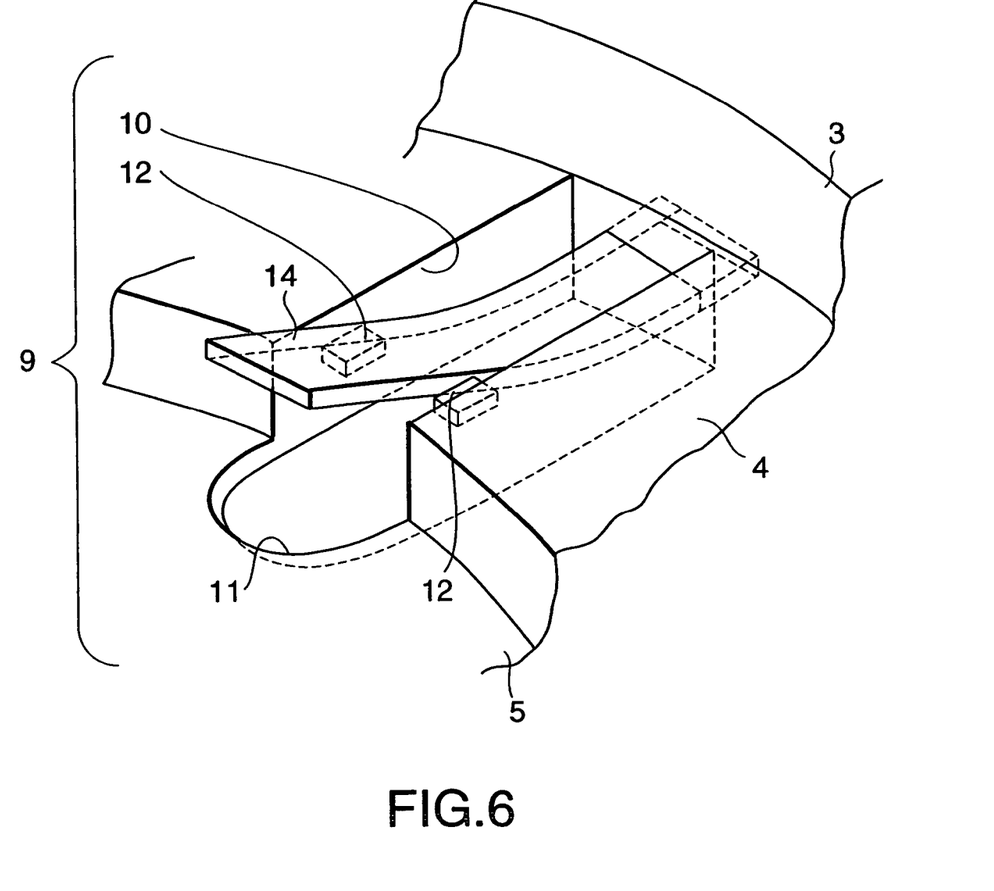
FIG. 6 is a perspective view and a sectional view of a variation of the smaller disk support lugs according to the first embodiment of the present invention.

In the above mentioned embodiment, examples of 12 cm and 8 cm disks are described as disk storage media having different diameters. However, the present invention is not limited to the disk storage media having the above mentioned diameters so far as the drive device can be used with disk storage media having different diameters. Furthermore, if a disk storage medium can be well balanced and supported when it is vertically set, then the number of smaller disk support lugs provided for the concave portion for a smaller diameter disk is not limited to four. For example, they can be provided at two or more lower points on the periphery of the concave portion for a smaller diameter disk. Additionally, according to the present embodiment, the flexible lugs can be obtained by bending metal line materials in the U shape. However, a plate spring, resin, and other form restoring elastic substances can replace a metal material. Additionally, the form of the flexible lugs is not limited to the U shape. That is, as shown in FIG. 6, it can be a plate etc. which can be easily processed. The structure of the stopper is not limited to the structure described in the above mentioned embodiment so far as the deformation of the flexible lugs can be maintained.

In addition, if the depth of the shallow groove portion 11 is larger than the diameter of the flexible lug 13, and the flexible lug 13 can be completely stored in the shallow groove portion 11, the four smaller disk support lugs 9 can be selectively used to support a disk without the interference between the flexible lug 13 and an 8 cm disk when the 8 cm disk 200 is inserted into the concave portion 5 for an 8 cm disk.

Figure 7:
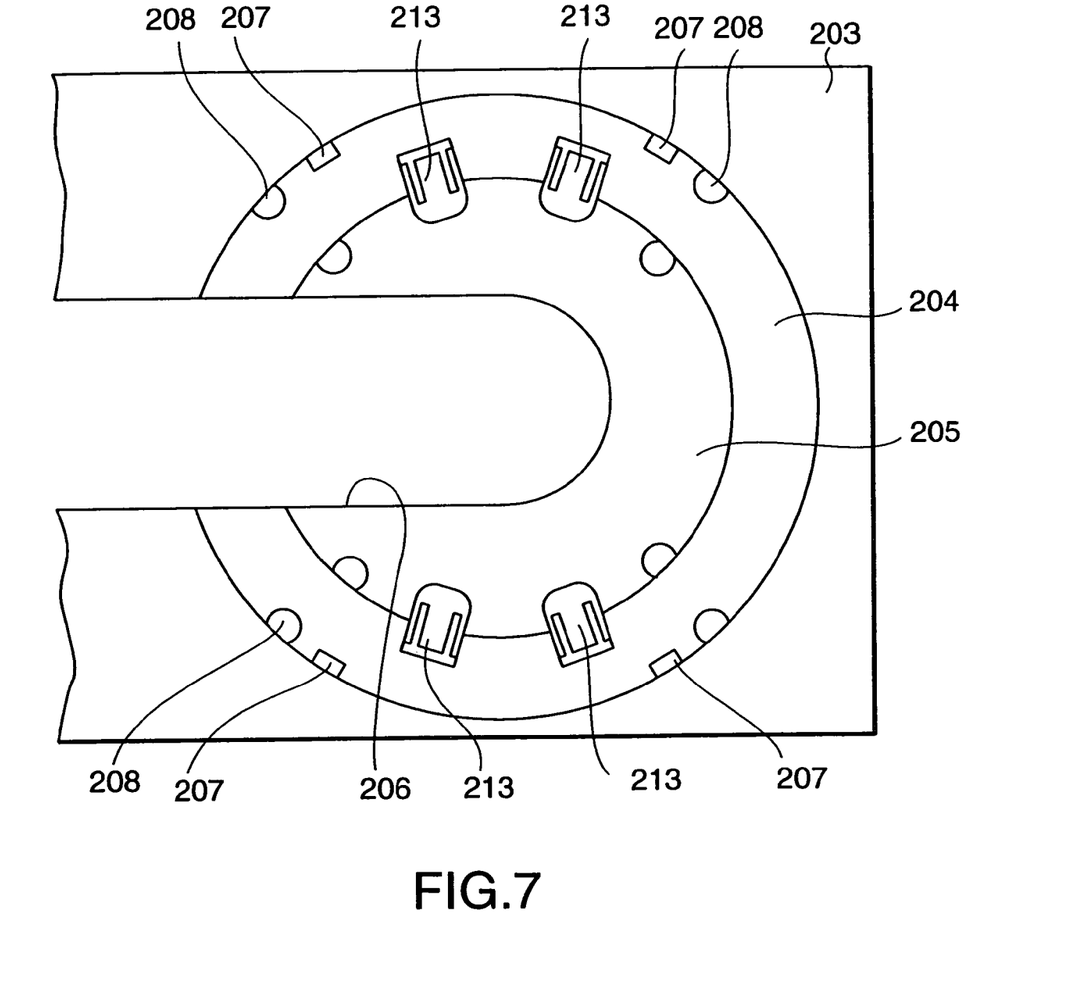
FIG. 7 is a side view (top surface) of the tray of the drive device according to a second embodiment of the present invention.

A second embodiment of the present invention will be described below by referring to the attached drawings. FIG. 7 is a view from the top surface of a tray 203 according to the second embodiment of the present invention. As compared with the view from the top surface shown in FIG. 2 according to the first embodiment of the present invention, the shape of a rotating lug 213 is different.

Figure 8A:
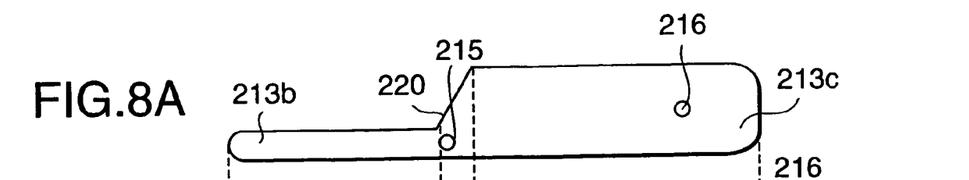
FIGS. 8A through 8C show the shape of the rotating lugs shown in FIG. 7.
Figure 8B:
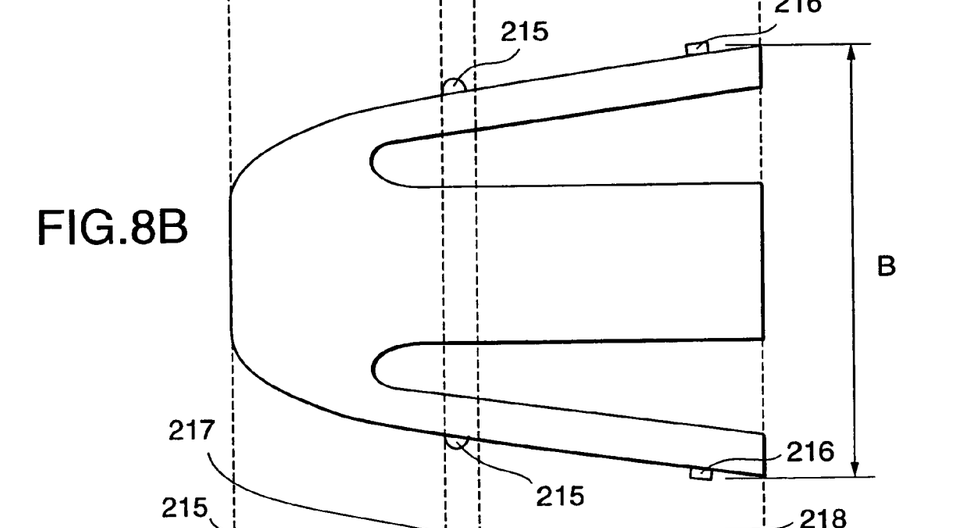

FIG. 8 shows the shape of the rotating lug 213 according to the second embodiment of the present invention. FIG. 8A is a side view of the rotating lug 213 shown in FIG. 7. In FIG. 8A, the rotating lug 213 has a slope 220. There is a thin plate to the left of the slope 220, and a thick plate to the right of the slope 220. FIG. 8B is a top view of the rotating lug 213 shown in FIG. 7. The rotating lug 213 branch off in three units by providing two slits in one plate. In FIG. 8B, the upper and lower branch units are not parallel to the central unit. That is, the right portions of them extend up and down. Then, the distance B between both outer sides of the upper and lower branch units is a little longer than the width of a storage groove 210 described later. A position control projection 215 is provided closer to a tip portion 213b of both sides of the rotating lug 213. An axis projection 216 is provided closer to a rear end 213c of both sides of the rotating lug 213. The position control projection 215 is hemispherical, and the axis projection 216 is cylindrical. The rotating lug 213 is made of an elastic material. In this example, the rotating lug 213 is made of resin.

Figure 8C:
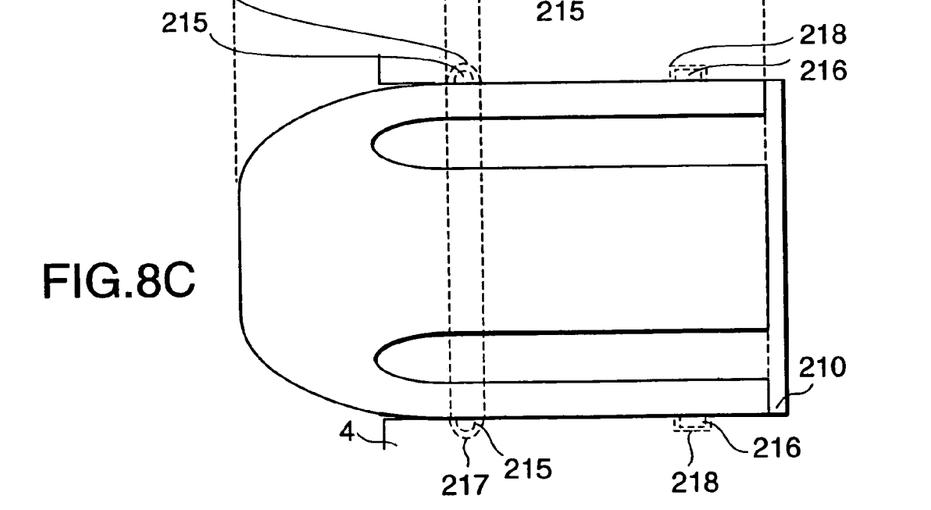

FIG. 8C is a top view of the rotating lug 213 which is put in the storage groove 210. In FIG. 8B, the positions in which upper and lower branch portions are elastically deformed using the branching off point as a fulcrum when the rotating lug 213 is put in the storage groove 210. In FIG. 8B, the upper and lower branch units are substantially parallel to the central unit of the three units. The position control projection 215 provided on both sides of the rotating lug 213 is fit to a hemispherical concave portion for position control 217. The axis projection 216 provided on both sides of the rotating lug 213 is fit to a cylindrical concave portion 218 for axis. Since the upper and lower branch units of the rotating lug 213 are elastically deformed, the upper and lower branch units are pushed to the storage groove 210 by the restoration force. Therefore, the axis projection 216 and the concave portion 218 for axis do not easily slip off each other. Since the position control projection 215 and the concave portion 217 for position control are hemispherical, they can easily slip off each other when force is applied to them. However, since the axis projection 216 and the concave portion for axis 218 are cylindrical, they can rotate but do not slip off each other when force is applied to them.

Figure 9A:
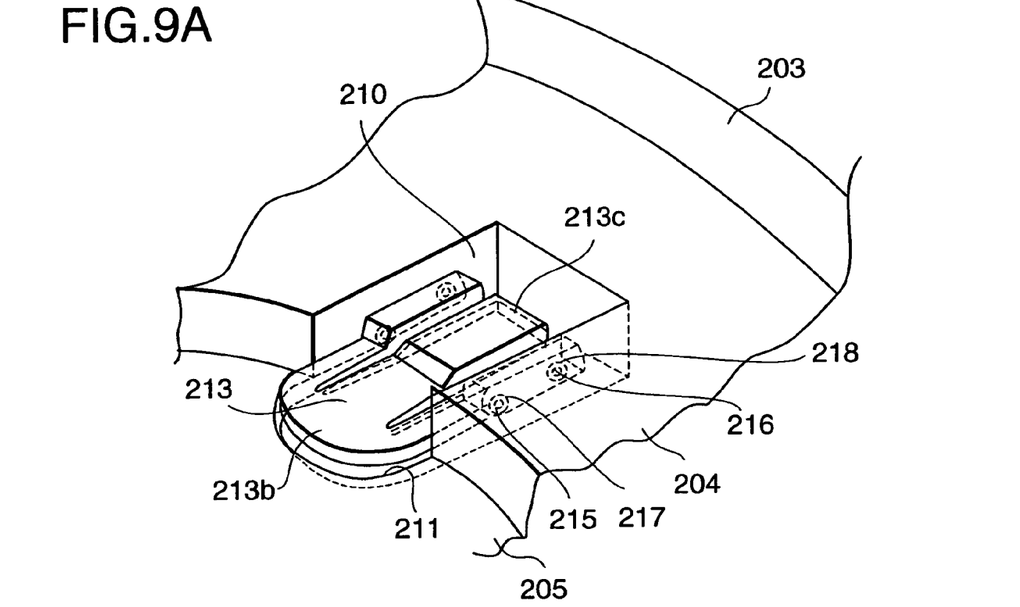
FIGS. 9A and 9B are a perspective view and a sectional view showing the detailed structure of the rotating lugs shown in FIG. 7.
Figure 9B:
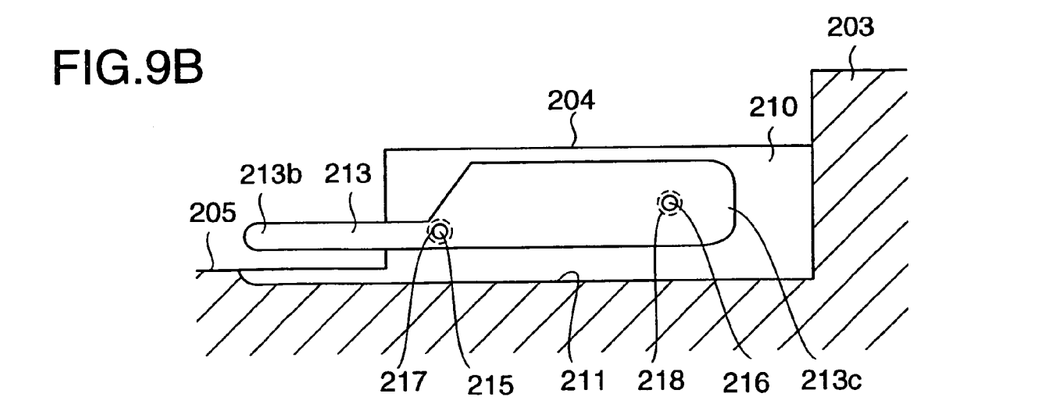

Next, the operations performed when the 12 cm disk 100 is inserted into the drive device body 1 will be described below. FIGS. 9A and 9B are a perspective view and a sectional view when the rotating lug 213 is loaded in the storage groove 210 and is not pulled out. As compared with the FIGS. 3A and 3B according to the first embodiment of the present invention, FIGS. 9A and 9B show a different shape of the rotating lug 213, show no stopper 12, but show the concave portion 217 for position control and the concave portion 218 for axis. The position control projection 215 and the axis projection 216 provided on both sides of the rotating lug 213 are respectively fit to the hemispherical concave portion 217 for position control and the cylindrical concave portion 218 for axis correspondingly provided in the storage groove 210. Assume that a 12 cm disk is inserted into a concave portion 204 for 12 cm disk. Since the rotating lug 213 is not pulled out, it does not interfere with the 12 cm disk 100. The 12 cm disk 100 is stably supported in the concave portion 204 for 12 cm disk.

Figure 10A:
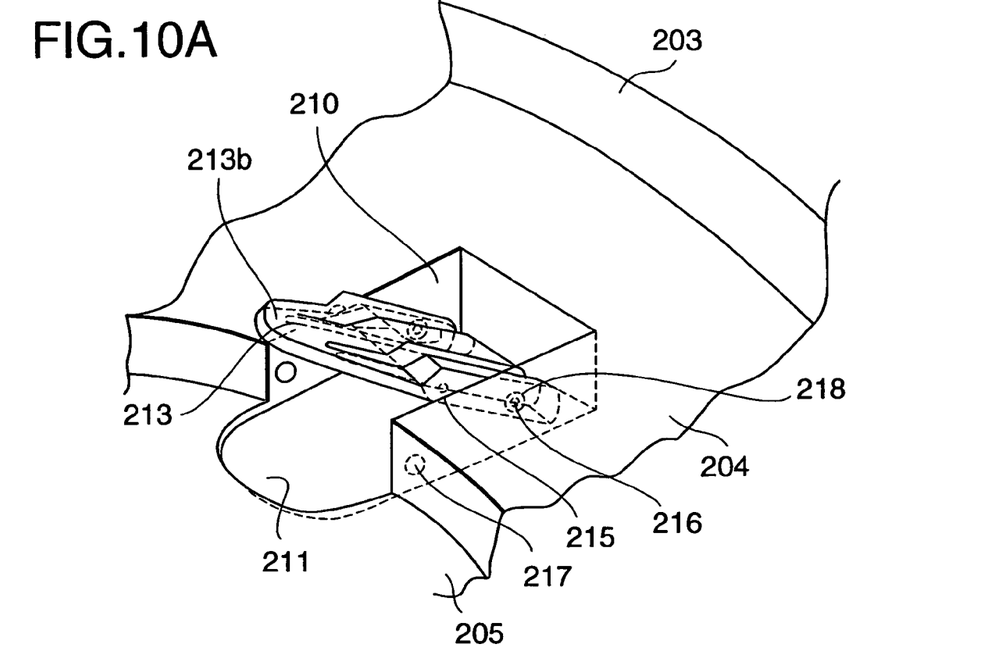
FIGS. 10A and 10B are a perspective view and a sectional view showing the detailed structure of the rotating lugs in operation shown in FIG. 7.
Figure 10B:
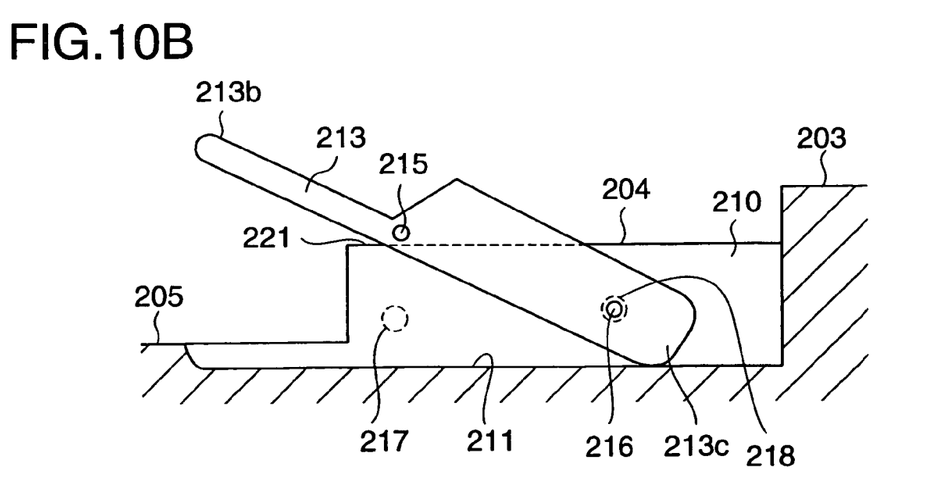

The operations performed when an 8 cm disk is inserted into the drive device body 1 will be described below. FIGS. 10A and 10B are a perspective view and a sectional view in which the rotating lug 213 is pulled out from the storage groove 210. From the states shown in FIGS. 9A and 9B, the tip portion 213b of the rotating lug 213 is pulled out by fingers etc. and force is applied to the surface of the tray 203. Thus, the position control projection 215 passes over the concave portion 217 for position control. Then, force is applied to the top surface of the tray 203 by fingers etc. The position control projection 215 passes over the edge 221 forming the boundary between the concave portion 204 for 12 cm disk and the storage groove 210. At this time, the axis projection 216 keeps fitting to the concave portion 218 for axis, and functions as the spindle of the rotating lug 213. The rear end 213c of the rotating lug 213 is designed such that the rear end 213c touches a shallow groove 211 when the position control projection 215 just passes over an edge 221 which is the boundary between the concave portion 204 for 12 cm disk and the storage groove 210. With the configuration, the tip portion 213b of the rotating lug 213 does not further move toward the top surface of the tray 203 or toward the reverse side of the tray 203. Therefore, the tip portion 213b of the rotating lug 213 maintains the projection on the surface of the periphery of a concave portion 205 for 8 cm disk.

Therefore, if the 8 cm disk 200 is inserted using the rotating lug 213 of the above mentioned state, the 8 cm disk 200 is protected from falling from the concave portion 205 for 8 cm disk.

In the above mentioned embodiment, examples of 12 cm and 8 cm disks are described as disk storage media having different diameters. However, the present invention is not limited to the disk storage media having the above mentioned diameters so far as disk storage media having different diameters are inserted into the drive device. Furthermore, so far as the disk storage media is well balanced and supported when they are vertically set, it is not always necessary to provide four rotating lugs. The above mentioned rotating lug 213 is made of resin, the material is not always limited to resin so far as the material is a metal or elastic substance having form restoration capacity.

As described above, the first embodiment according to the present invention is provided with smaller disk support lugs on the tray having a concave portion for supporting a disk. The smaller disk support lugs comprise, in the storage groove provided at a plurality of points on the periphery of the concave portion for a larger diameter disk, flexible lugs with elastic deformation whose tip portions project into the periphery of the concave portion for a smaller diameter disk, and a stopper to keep the tip portions of the flexible lugs projecting on the surface of the periphery of the concave portion for a smaller diameter disk.

The second embodiment according to the present invention is provided with rotating lugs on the tray having a concave portion for supporting a disk. The rotating lugs comprise, in the storage groove provided in a plurality of points on the periphery of the concave portion for a larger diameter disk, a first projection as an axis for rotating the rotating lugs, and a second projection to keep the tip portion projecting into the periphery of the concave portion for a smaller diameter disk.

Therefore, the first and second embodiments of the present invention can support a larger diameter disk storage medium, and also can support a smaller diameter disk storage medium using smaller disk support lugs. Therefore, disk storage media having different diameters can be vertically set and inserted without an adapter, the number of parts configuring smaller disk support lugs can be reduced, a metal mold can be designed with a simple structure, the producibility can be improved, and the reliability with time can also be improved.

Furthermore, in the second embodiment of the present invention as compared with the first embodiment in which the lugs are made of metal wire, the lugs are resin molds. Therefore, the lugs can be mass-produced with enhanced yield. In addition, as compared with a metal wire processed goods, the lugs are small and light, thereby successfully reducing the transportation cost of the lugs, and reducing the weight of the finished goods.

While this invention has been described with reference to illustrative embodiments, this description is not intended to be construed in a limiting sense. Various modifications of the illustrative embodiments as well as other embodiments of the invention will be apparent to persons skilled in the art upon reference to this description. It is, therefore, contemplated that the appended claims will cover any such modifications or embodiments as fall within the true scope of the invention.

What is claimed is:

1. A removable disk drive apparatus, comprising:
a tray on which a plurality of concave portions for a disk for supporting disk storage media having different diameters are formed in the concentric positions, wherein said tray comprises:
larger disk support lugs provided at a plurality of points on a periphery of a concave portion for a larger diameter disk;
a storage groove provided at a plurality of points on the periphery of the concave portion for a smaller diameter disk;
said storage groove including:
a first concave portion provided opposite each other in the radial direction in a position closer to a center of the concave portion for a smaller diameter disk on both sides of said storage groove; and
a second concave portion opposite each other in the radial direction in the position apart from the center of the concave portion for a smaller diameter disk; and
a rotating lug provided in said storage groove, and having a first convex portion and a second convex portion on both sides respectively corresponding to said first and second concave portions in the storage groove;
said rotating lugs being supported as rotatable by fitting the second convex portion into the second concave portion in the storage groove; and
said rotating lugs rotating using as an axis the second convex portion on both sides fit into the second concave portion when the first convex portion is removed from the first concave portion on both sides, the rear ends of the rotating lugs touch the storage groove when the first convex portion on both sides passes over the edge which is a boundary between the concave portion for a larger diameter disk and the storage groove, thereby holding a state in which the tip portion of a smaller disk diameter projects above the surface of the periphery of the concave portion for a smaller diameter disk from the storage groove.

2. The removable disk drive apparatus according to claim 1, wherein
said front convex portions on both sides and corresponding front concave portions are hemispherical, and said rear convex portion on both sides and corresponding rear concave portions are cylindrical.

3. The removable disk drive apparatus according to claim 1, wherein
said rotating lugs branch off in three units from one plate, the branch units on both ends are radially spread on the concave portion for a larger diameter disk, and a distance between both outer sides of the branch units is formed a little larger than a width of the storage groove.

4. The removable disk drive apparatus according to claim 2, wherein
said rotating lugs branch off in three units from one plate, the branch units on both ends are extend up and down, and a distance between the divided units on both ends is formed a little larger than a width of the storage groove.

* * * * *